United States Patent
Utsumi

(10) Patent No.: US 7,592,725 B2
(45) Date of Patent: Sep. 22, 2009

(54) MOTOR AND MANUFACTURING METHOD THEREFOR

(75) Inventor: Shinichi Utsumi, Nagano (JP)

(73) Assignee: Nidec Sankyo Corporation (JP)

( * ) Notice: Subject to any disclaimer, the term of this patent is extended or adjusted under 35 U.S.C. 154(b) by 312 days.

(21) Appl. No.: 11/656,794

(22) Filed: Jan. 23, 2007

(65) Prior Publication Data
US 2007/0170808 A1    Jul. 26, 2007

(30) Foreign Application Priority Data
Jan. 25, 2006    (JP) .............................. 2006-016439

(51) Int. Cl.
*H02K 5/00*    (2006.01)

(52) U.S. Cl. .................. 310/89; 310/49 R; 310/261; 310/257

(58) Field of Classification Search ............... 310/49 R, 310/49 A, 89, 261, 254, 257–259
See application file for complete search history.

(56) References Cited

U.S. PATENT DOCUMENTS

| | | | |
|---|---|---|---|
| 4,333,026 A * | 6/1982 | Bock et al. ...................... 310/42 |
| 4,841,190 A * | 6/1989 | Matsushita et al. ............ 310/257 |
| 5,043,613 A * | 8/1991 | Kurata et al. ................. 310/49 R |
| 5,187,400 A * | 2/1993 | Kurata ........................ 310/49 R |
| 6,707,196 B2 * | 3/2004 | Mayumi ....................... 310/89 |
| 6,727,608 B2 * | 4/2004 | Yamawaki et al. ........... 310/49 R |
| 6,774,512 B2 * | 8/2004 | Takagi et al. ................ 310/49 R |
| 6,876,109 B2 * | 4/2005 | Matsushita et al. .......... 310/49 R |
| 2002/0005670 A1* | 1/2002 | Takagi et al. ................ 310/49 R |

FOREIGN PATENT DOCUMENTS

JP    2003-47218    2/2003

* cited by examiner

*Primary Examiner*—Thanh Lam
(74) *Attorney, Agent, or Firm*—Cantor Colburn LLP

(57) ABSTRACT

A motor includes a motor case having an opening part and a stator core disposed in an inside of the motor case. The motor case may include a bottom face part, sidewall parts extended on the opening part side from an outer periphery of the bottom face part, and cutout parts formed by cutting the sidewall parts. Non-contact parts are formed in an outer peripheral edge of the stator core so that the stator core does not contact with an inner face of the motor case at the non-contact parts, i.e., with a burr formed at the cutout part of the motor case. Alternatively, the motor case may be formed as an outer stator core and the stator core may be formed as an inner stator core.

17 Claims, 7 Drawing Sheets

PRIOR ART

MOTOR AND MANUFACTURING METHOD THEREFOR

The present invention claims priority under 35 U.S.C. §119 to Japanese Application No. 2006-16439 filed Jan. 25, 2006, which is incorporated herein by reference.

FIELD OF THE INVENTION

An embodiment of the present invention may relate to a motor and a manufacturing method for the motor.

BACKGROUND OF THE INVENTION

In recent years, accompanied with the miniaturization of an optical apparatus, an information apparatus, an audio apparatus or the like, a motor used in the apparatus is also required to be in a compact and thin structure. As shown in FIG. 7, a motor for coping with its miniaturization and thinner shape has been known which includes a motor case 100 in which cutout parts 101 are formed in parts of the motor case 100 along a face parallel to an axial direction to form the shape of a bottom face part 102 of the motor case 100 in an oval shape. A manufacturing method for the motor case 100 having the cutout parts 101 has been proposed in which, after a cylindrical sidewall part 103 has been formed, the cutout parts 101 are formed by cutting out two portions of the sidewall part 103 in the axial direction (see, for example, Japanese Patent Laid-Open No. 2003-47218).

However, in the motor case 100 formed as described above, the cutout part 101 is formed by cutting out a part of the sidewall part 103 of the motor case 100 with a shearing machine provided with a sharp cutting tool or the like. Therefore, burrs are formed at an edge part 104 of the cutout part 101 in the sidewall part 103 of the motor case 100. The motor case 100 is formed of a thin plate member which is made of a steel plate structured of magnetic material such as iron on which plating is performed in order to cope with the miniaturization and thinner shape of the motor. Therefore, in the case that a burr is formed at the edge part 104 of the sidewall part 103 of the motor case 100, when a stator core is assembled in an inner peripheral face 106 of the motor case, the burr formed at the edge part 104 of the sidewall part 103 of the motor case 100 is brought into contact with an outer peripheral edge of the stator core. As a result, the sidewall part 103 of the motor case 100 is displaced on the outer side in a radial direction and the shape of the motor case 100 is deformed and thus the dimensional accuracy of the motor case 100 cannot be secured.

It is conceivable that burrs formed at the edge part 104 of the sidewall part 103 of the motor case 100 are removed by barrel processing or it is conceivable that a formed direction of the burrs is changed. However, the shape of the motor case 100 may be deformed by a load due to the barrel processing or a barrel used in the barrel processing is brought into contact with other portions such as pole teeth 105 and thus, especially, the shapes or inclinations of the pole teeth 105 may be changed. Further, since another facility or production process is required, production cost for the motor case 100 increases.

SUMMARY OF THE INVENTION

In view of the problems described above, an embodiment of the present invention may advantageously provide a motor which is capable of preventing deformation in shape of a motor case to secure dimensional accuracy of the motor case, and provide a manufacturing method for the motor.

Thus, according to an embodiment of the present invention, there may be provided a motor including a rotor shaft, a motor case having an opening part which opens in an axial direction of the rotor shaft, and a stator core which is disposed in an inside of the motor case. The motor case includes a bottom face part which faces the opening part, a sidewall part which is extended on the opening part side from an outer periphery of the bottom face part, and cutout parts which are formed by cutting the side wall part to face in parallel with each other in a radial direction of the rotor shaft. Further, non-contact parts are formed in an outer peripheral edge of the stator core so that the stator core does not contact with an inner face of the motor case at the non-contact parts.

According to the embodiment described above, deformation in shape of the motor case is prevented and thus dimensional accuracy of the motor case can be secured.

Further, according to an embodiment of the present invention, there may be provided a motor including a rotor shaft, a motor case having an opening part which opens in an axial direction of the rotor shaft, and a stator core which is disposed on an inner side of the motor case. The motor case includes a bottom face part which faces the opening part, first sidewall parts which are formed in a straight shape and extended on the opening part side from an outer periphery of the bottom face part, second sidewall parts which are formed in a circular arc shape and extended on the opening part side from the outer periphery of the bottom face part, and cutout parts which are formed by cutting the first sidewall parts in a state that a part of the first sidewall part is left. In addition, non-contact parts are formed in an outer peripheral edge of the stator core so that the stator core does not contact with an inner face of the motor case at the non-contact parts.

According to the embodiment described above, since a part of the first sidewall part functions as a reinforcement part for the motor case, deformation in shape of the motor case, for example, easy deformation of the sidewall part is prevented and thus dimensional accuracy of the motor case can be secured.

In accordance with an embodiment, the stator core is disposed on the inner side of the motor case so that the non-contact part of the stator core is located at a position corresponding to a cut-out end face of the sidewall part of the motor case. Specifically, it is preferable that the stator core is fixed to the motor case in a tightly contacted manner by the stator core which is press-fitted to an inner face of the motor case, and the non-contact part of the stator core is located at a position corresponding to an end face of the cutout part which is formed in the sidewall part of the motor case.

Also, in accordance with an embodiment, a protrusion receiving part is formed in the sidewall part of the motor case to engage with a protruded part which is formed in the stator core, and the motor case and the stator core are positioned with each other in a circumferential direction by the protruded part of the stator core which is engaged with the protrusion receiving part of the motor case. In this case, it is preferable that second non-contact parts are formed on both sides of the protruded part of the stator core such that the stator core does not contact with an edge part of the sidewall part of the motor case at the second non-contact parts.

According to the embodiment described above, even when a burr is formed at the cut-out end face of the sidewall part of the motor case by forming the cutout part, the burr does not affect the position of the stator core which is disposed in the inside of the motor case. Therefore, deformation in shape of the motor case is prevented and thus dimensional accuracy of the motor case can be secured. In addition, since a gap space is not formed between the motor case and the stator core, deterioration of characteristic of a magnetic circuit is prevented and thus deterioration of a motor characteristic such as variation of an output torque and deterioration of rotational accuracy can be prevented.

In order to manufacture the motor as described above, the motor case may be structured by a manufacturing method comprising a forming step for forming the motor case in a shape having the first sidewall parts, the second sidewall parts and the bottom face part by drawing or squeezing working, and a cut-out step for forming the cutout part in the first sidewall part which is formed by the forming step, and the cut-out step is performed from a side direction such that a part of the first sidewall part is left.

According to the manufacturing method in accordance with the embodiment, since the cutout part is formed in the sidewall part by cutting out from a side direction, deterioration of accuracy in a cylindrical shape of the motor case is restrained. Also, the cutout part may be formed by cutting the side wall part so as to leave a part of the sidewall part as a reinforcement part.

In accordance with an embodiment, an outer stator core is integrally structured with the motor case. Alternatively, the present invention may be applied to an outer stator core which is separately formed from the motor case. In this case, the motor case described in the above-mentioned embodiment is structured as an outer stator core and a stator core disposed in the inside of the motor case is structured as an inner stator core. According to this embodiment, deformation in shape of the outer stator core is prevented and thus dimensional accuracy of the outer stator core can be secured. Alternatively, since a part of the sidewall part functions as a reinforcement part for the outer stator core, deformation in shape of the outer stator core, for example, easy deformation of the sidewall part is prevented and thus dimensional accuracy of the outer stator core can be secured.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

Figure 1:
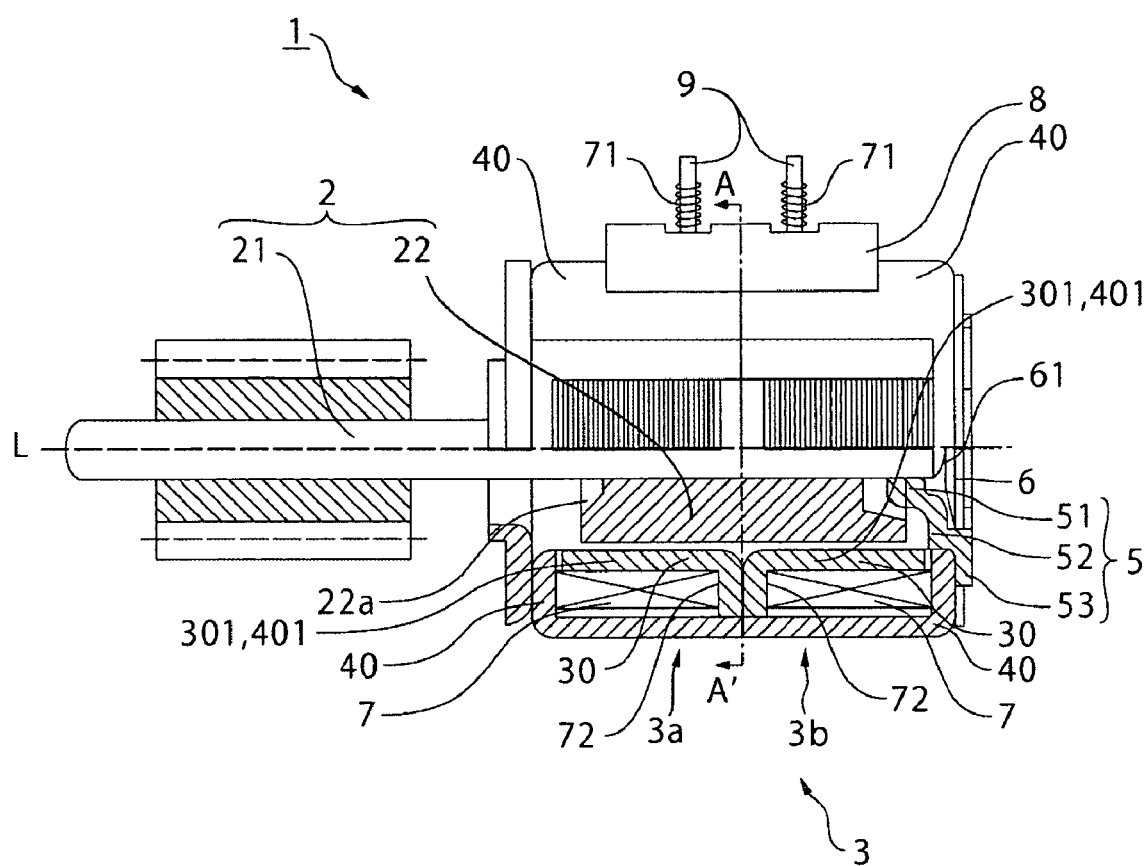
FIG. 1 is a half cross sectional view showing a stepping motor in accordance with a first embodiment of the present invention.

An embodiment of a stepping motor to which the present invention is applied will be described below with reference to the accompanying drawings. FIG. 1 is a half cross sectional view showing a stepping motor in accordance with a first embodiment of the present invention.

First Embodiment

As shown in FIG. 1, a motor 1 in accordance with a first embodiment of the present invention is a PM (permanent magnet) type of stepping motor which is used in a lens drive device of a digital camera or a digital video camera, or the like. The motor 1 includes a rotor 2 having a rotor shaft 21 and a rotor magnet (permanent magnet) 22 and a stator 3 which is disposed to face the rotor magnet 22 via a clearance. The rotor shaft 21 is rotatably supported by a bearing 5 and is urged in an axial direction "L" by a spring member 6 which abuts with an end of the rotor shaft 21.

The rotor magnet 22 is fixed on the rotor shaft 21 structuring the rotor 2 with an adhesive and the rotor magnet 22 is comprised of a permanent magnet which is formed in a substantially cylindrical shape. Further, circular recessed parts 22a are formed on both end faces of the rotor magnet 22 in the axial direction "L" of the rotor shaft 21. The weight of the rotor magnet 22 itself is reduced by forming the recessed parts 22a. The other end portion of the rotor shaft 21 is formed as an output shaft which is extended for outputting rotation of the motor 1.

The stator 3 is structured in a two-phase structure with a first stator assembly 3a and a second stator assembly 3b which is fixed, back to back, to the first stator assembly 3a. In accordance with the first embodiment, since basic structure of the second stator assembly 3b is the same as that of the first stator assembly 3a, the same notational symbols will be used below in the common portions.

Each of the first stator assembly 3a and the second stator assembly 3b is provided with a ring-shaped inner stator core 30 in which a plurality of pole teeth 301 are erected from its inner circumferential edge portion and a ring-shaped outer stator core 40 which is overlapped on the inner stator core 30 in the axial direction "L". A plurality of pole teeth 401 is erected from an inner circumferential edge portion of the outer stator core 40 to be interposed between the pole teeth 301 of the inner stator core 30, and the pole teeth 301 of the inner stator core 30 and the pole teeth 401 of the outer stator core 40 respectively face the rotor magnet 22 of the rotor 2.

In the first embodiment, since the outer stator core 40 is also used as a motor case, the outer stator core 40 will be described and referred below as a motor case 40.

Drive coils 7 are respectively disposed around outer peripheries of the pole teeth 301, 401 in the first stator assembly 3a and the second stator assembly 3b. In this embodiment, the drive coil 7 is a bobbinless and ring-shaped air-core coil. An insulating film is formed on the entire surface of the air-core coil by, for example, dipping coating to enhance its insulation property.

Windings 71 are drawn out from end faces 72 of the drive coils 7 in the axial direction "L", which face the inner stator cores 30, and are connected to terminal pins 9.

In the first embodiment, an insulation sheet (not shown) is disposed between the inner stator core 30 and the drive coil 7 in both the first stator assembly 3a and the second stator assembly 3b to prevent the inner stator core 30 and the drive coil 7 from forming a short circuit based on contacting with each other.

A bearing 5 is formed with resin having a lubricating property and rotatably supports an end of the rotor shaft 21 in the radial direction. The bearing 5 for supporting the rotor shaft 21 in the radial direction is formed with a bearing part 51 which supports the rotor shaft 21 passing through the bearing part 51, a press fitting part 52 which is press-fitted and fixed to an inner periphery of the motor case 40 in the second stator assembly 3b, and a flange part 53 which is formed by protruding one part of an outer peripheral portion of the press fitting part 52 in the radial direction.

The bearing part 51 is disposed to enter into the recessed part 22a which is formed in the rotor magnet 22 to restrain a dimension in the axial direction "L" of the entire motor 1. Further, an inner diameter of the bearing part 51 is set in a dimension with respect to an outer diameter of the rotor shaft 21 such that a clearance is formed between the bearing part 51 and the rotor shaft 21. Further, the flange part 53 is placed on the motor case 40 of the second stator assembly 3b to perform positioning in the axial direction "L" of the bearing part 51.

A spring member 6 is formed of one piece of a metal plate and provided with a spring piece 61 which abuts with an end of the rotor shaft 21. The spring piece 61 abuts with the end of the rotor shaft 21 to urge the rotor shaft 21 in the axial direction L. Further, the spring member 6 is welded and fixed to the motor case 40 of the second stator assembly 3b.

Figure 2A:
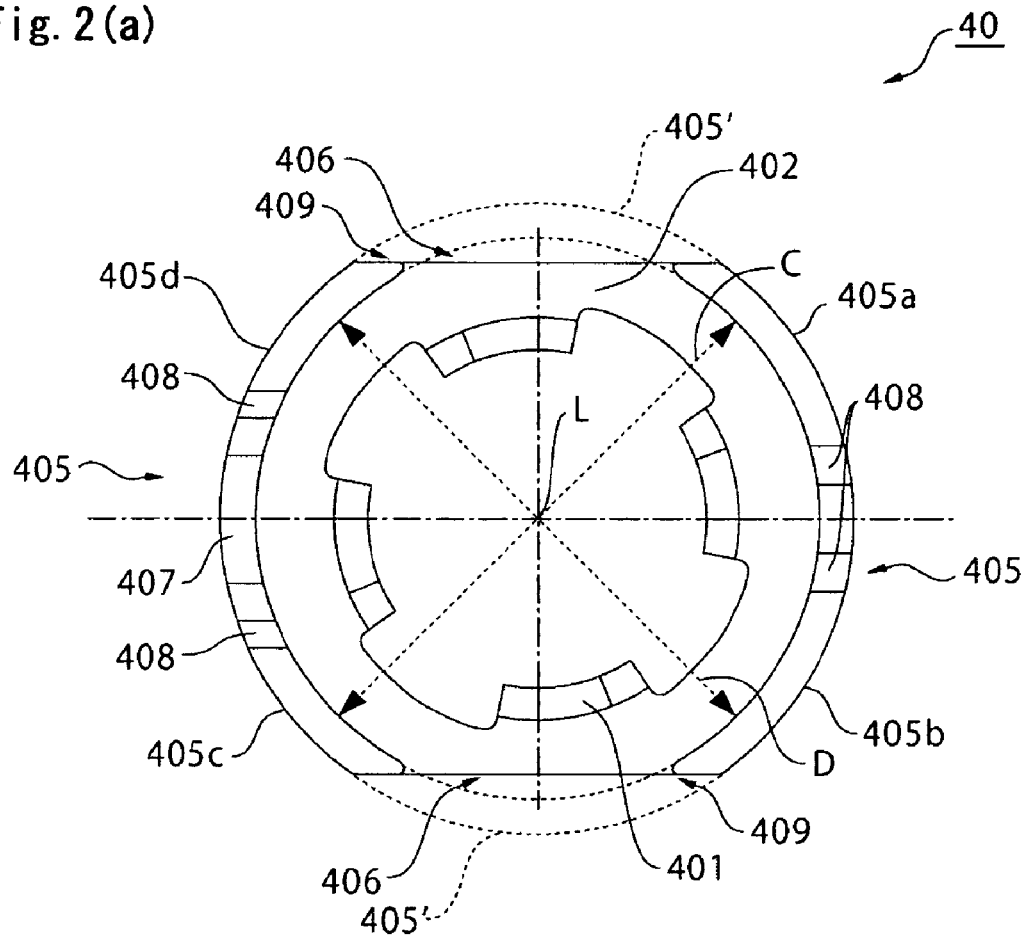
FIG. 2(a) is a plan view showing a motor case in accordance with the first embodiment of the present invention and FIG. 2(b) is its side view.
Figure 2B:
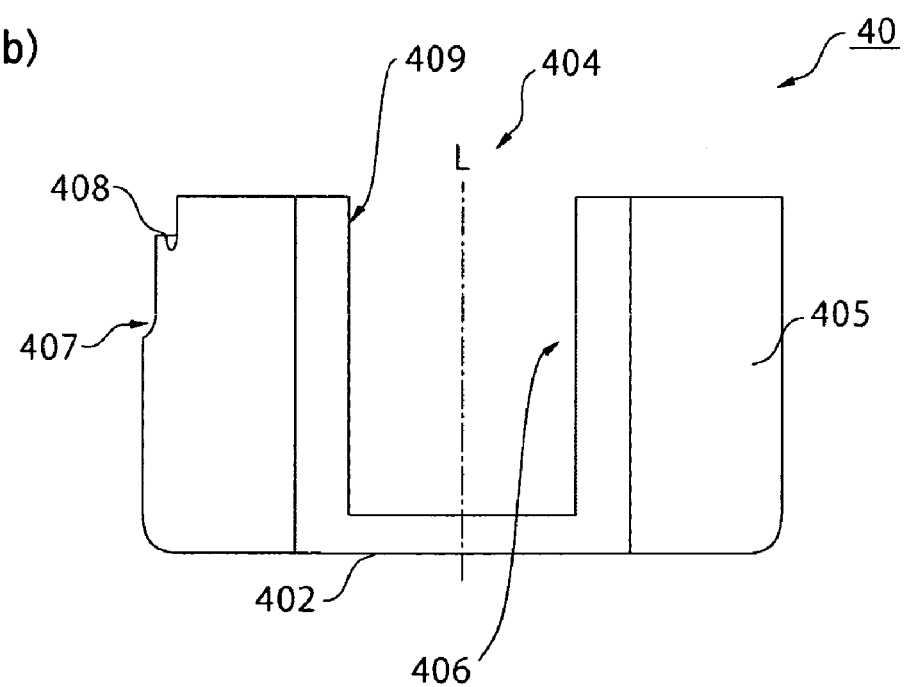

Next, a structure of the motor case which is also used as an outer stator core will be described with reference to FIGS. 2(a) and 2(b). FIG. 2(a) is a plan view showing the motor case in accordance with the first embodiment of the present invention and FIG. 2(b) is its side view. In FIG. 2(b), illustration of the pole teeth is omitted.

As shown in FIGS. 2(a) and 2(b), the motor case 40 which is also used as an outer stator core is formed such that an external shape of a bottom face part 402 viewed from the axial direction "L" of the rotor shaft 21 is a roughly oval shape. More specifically, the motor case 40 is provided with an opening part 404 which opens on one side in the axial direction "L" of the rotor shaft 21, the bottom face part 402 which faces the opening part 404 and from which a plurality of pole teeth 401 are erected from an inner circumferential edge portion toward the opening part 404 side, and a sidewall part 405 extended toward the opening part 404 side from an outer periphery of the bottom face part 402. Further, in FIG. 2(a), the motor case 40 is also provided with cutout parts 406 which are formed by cutting two portions (sidewall parts 405' shown by the broken line) which face in parallel to each other in the radial direction with respect to the axial direction "L" of the rotor shaft 21. The sidewall part 405 after the cutout parts 406 have been formed is formed such that, as shown in FIG. 2(a), two portions facing each other radially with respect to the axial direction "L" of the rotor shaft 21 are formed in a partially cylindrical shape. Since the shape of the motor case 40 is formed in a roughly oval shape by cutting the sidewall parts 405', the dimension in a widthwise direction of the motor case 40 is reduced to cause its size smaller and thinner by the amount of the cutout portions of the sidewall parts 405' in comparison with a conventional cylindrical motor case.

A cutout part 407 for terminal which is cut from the opening part 404 side is formed in the sidewall part 405. Further, protrusion receiving parts 408 are formed on both sides of the cutout part 407 for terminal in the sidewall part 405 to engage with a protruded part 304 which is formed in the inner stator core 30 described below. When the protruded part 304 formed in the inner stator core 30 is engaged with the protrusion receiving part 408 formed in the motor case 40, the inner stator core 30 is positioned in the circumferential direction to the motor case 40. In other words, the pole teeth 401 formed in the motor case 40 are positioned to the pole teeth 301 formed in the inner stator core 30 in the circumferential direction.

Figure 3:
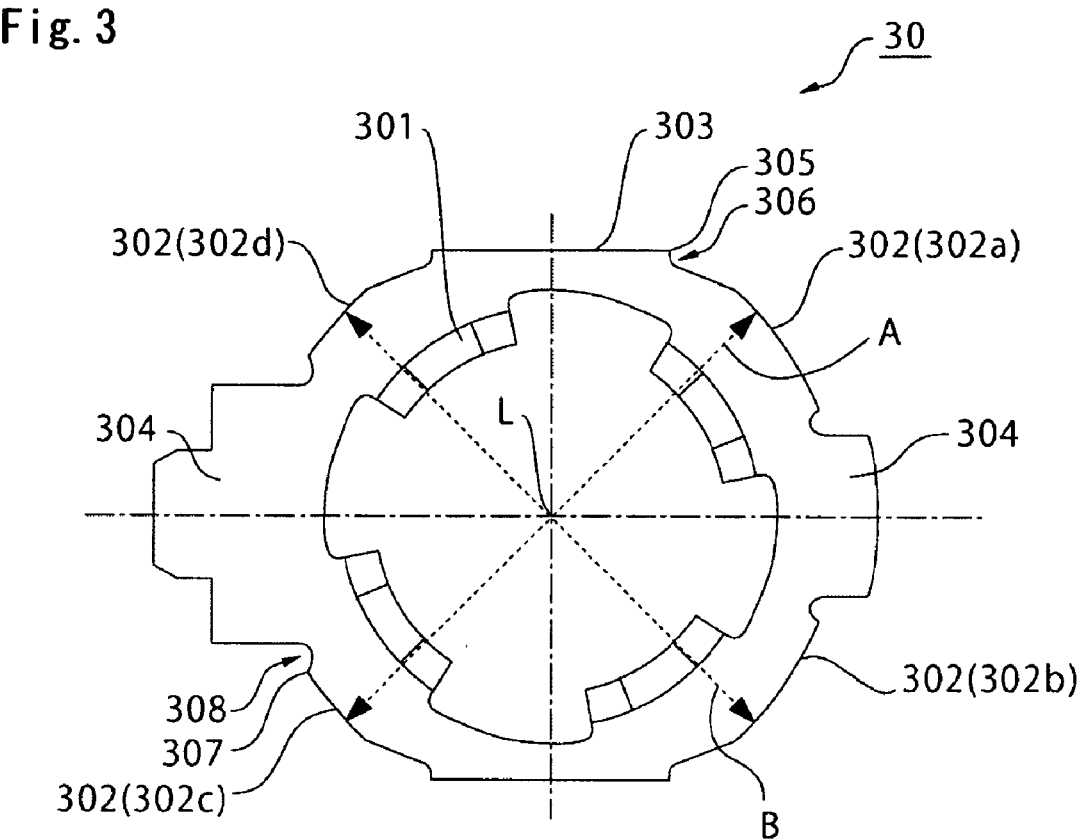
FIG. 3 is a plan view showing a stator core in accordance with the first embodiment.

Next, a structure of the stator core will be described with reference to FIG. 3. FIG. 3 is a plan view showing an inner stator core in accordance with the first embodiment. The inner stator core 30 in the first embodiment is formed, as shown in FIG. 3, similarly to the motor case 40, which is also used as the outer stator core, such that its external shape viewed from the axial direction "L" of the rotor shaft 21 is formed in a roughly oval shape in which four corner parts 302 are formed in a roughly circular arc shape. More specifically, when the inner stator core 30 is disposed on the inner side of the motor case 40 (the state shown in FIG. 4), portions of the inner stator core 30 located in the cutout parts 406 formed in the motor case 40, in other words, two long side portions of the inner stator core 30 are formed as straight parts 303 which are respectively formed in a straight shape. The protruded parts 304 which engage with the protrusion receiving parts 408 formed in the motor case 40 are formed at two short side portions of the inner stator core 30. Further, the protruded part 304 formed on its left side in FIG. 3 is also used as a support portion for fixing a terminal block 8.

Non-contact parts 306 which do not contact with the inner face of the motor case 40 are formed at four boundary parts 305 between the straight parts 303 and four circular arc-shaped corner parts 302 in the outer peripheral edge portion of the inner stator core 30. The non-contact part 306 is formed to be located at an end face of the sidewall part 405 where the cutout part 406 of the motor case 40 is formed, i.e., at a cutout end face 409 when the inner stator core 30 is disposed in the motor case 40. The shape and the size of the non-contact part 306 are not limited to a specified example. However, the shape and the size are preferable to be formed such that the inner stator core 30 is not affected by a burr even when the burr is formed from the cutout end face 409 of the motor case 40 in a side direction or the radial direction (inner side direction of the motor case).

In the first embodiment, non-contact parts 308 which do not contact with the inner face of the motor case 40 are formed at four boundary parts 307 of the inner stator core 30 between the protruded parts 304 and four circular arc-shaped corner parts 302. The non-contact part 308 is formed at a position corresponding to the end face of the sidewall part 405 which is adjacent to the protrusion receiving part 408 in the circumferential direction when the protrusion receiving part 408 is formed in the motor case 40.

A dimension of an outer diameter of the inner stator core 30 is set to be slightly larger than that of an inner diameter of the motor case 40. More specifically, a dimension of an outer diameter of the inner stator core 30 which is formed by a diagonal line of a circular arc-shaped corner part 302a and a circular arc-shaped corner part 302c, and a dimension of an outer diameter of the inner stator core 30 which is formed by a diagonal line of a corner part 302b and a corner part 302d (dimensions shown by the broken lines "A" and "B" in FIG. 3) are respectively set to be slightly larger than that of an inner diameter of the motor case 40 which is formed by a diagonal line of a sidewall part 405a and a sidewall part 405c and a dimension of an inner diameter which is formed by a diagonal line of the sidewall part 405b and the sidewall part 405d (dimensions shown by the broken lines "C" and "D" in FIG. 2(a)). Therefore, the respective corner parts 302a, 302b, 302c and 302d are formed as press-fitting faces to the motor case 40 and the non-contact parts 306 are respectively formed between the respective press-fitting faces and the straight parts 303. Accordingly, since the inner stator core 30 is press-fitted into the inner face of the motor case 40, the inner stator core 30 is fixed to the motor case 40 in an enhanced tightly abutted state and positional displacement between the inner stator core 30 and the motor case 40, i.e., the outer stator core can be prevented.

Figure 4:
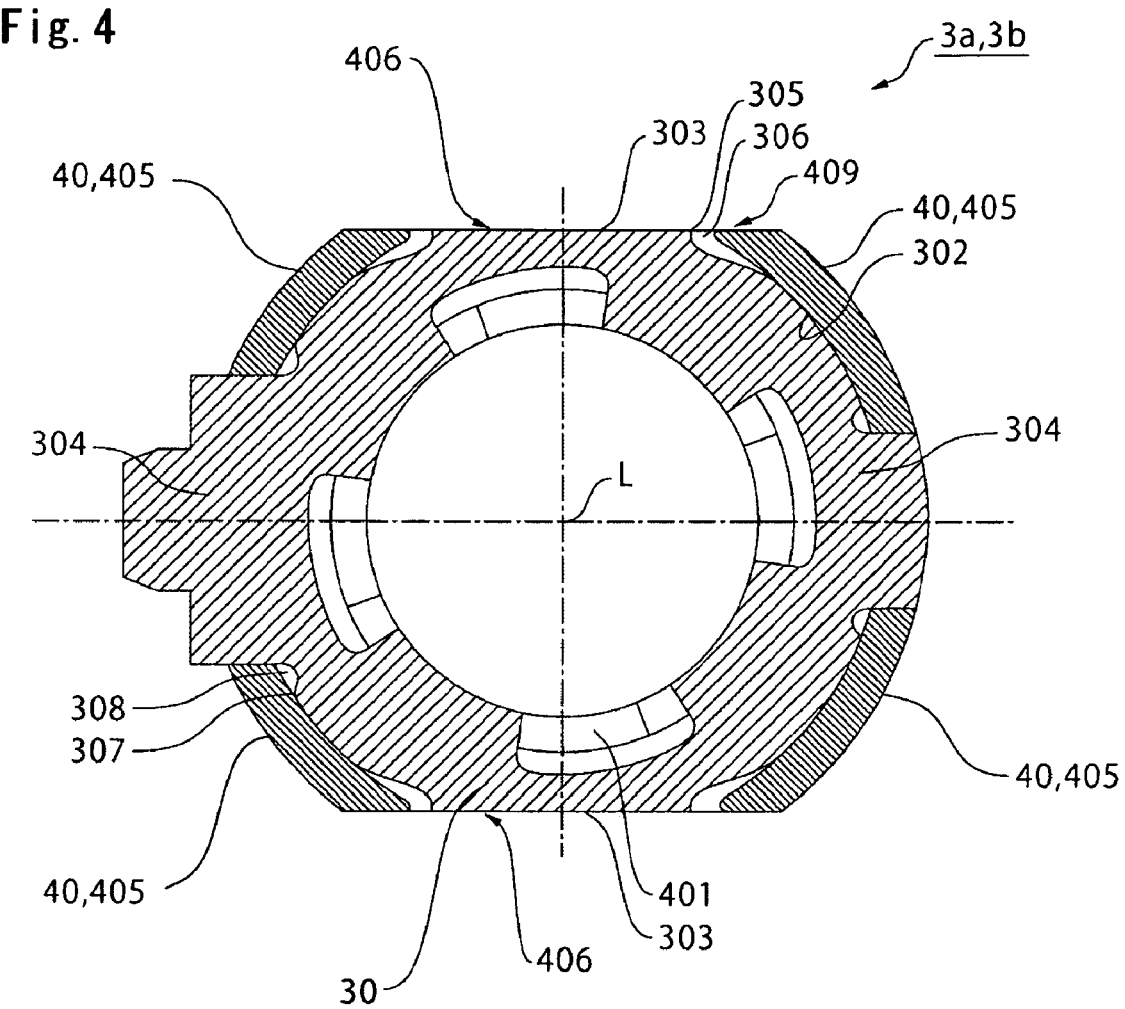
FIG. 4 is a cross-sectional view showing a structure of a stator of the stepping motor which is cut by the "A-A'" line in FIG. 1

Next, a structure of a stator assembly of the motor 1 will be described with reference to FIG. 4. FIG. 4 is a cross-sectional view showing a structure of the first stator assembly in which the inner stator core and the motor case which is also used as an outer stator core are assembled and where the motor 1 shown in FIG. 1 is cut by the "A-A'" line in the first embodiment. In FIG. 4, only the motor case 40 and the inner stator core 30 are illustrated and other components are not shown in the drawing. Further, since the first stator assembly 3a and the second stator assembly 3a have the same structure, description on the second stator assembly 3b is omitted.

In the motor 1 in accordance with the first embodiment, as shown in FIG. 4, the inner stator core 30 is disposed on the inner side of the motor case 40, and thus four corner parts 302 of the inner stator core 30 which are formed as the press-fitting faces to the motor case 40 and the inner peripheral face of the sidewall part 405 of the motor case 40 are fixed to each other in a tightly abutted state.

Further, the non-contact part 306 is formed at a position of an end face of the sidewall part 405 where the cutout part 406 of the motor case 40 is formed in the outer peripheral edge portion of the inner stator core 30, in other words, at a portion located in the cutout end face 409. Specifically, the non-contact parts 306 are formed between the corner parts 302a, 302b, 302c, 302d as the press-fitting face and the straight parts 303. Therefore, a gap space is formed between the cutout end face 409 of the sidewall part 405 of the motor case 40 and the non-contact part 306 of the inner stator core 30. Accordingly, even when a burr is formed at the cutout end face 409 of the sidewall part 405 of the motor case 40 in the case that the cutout part 406 is formed in the motor case 40, the outer peripheral edge portion of the inner stator core 30 does not contact with the burr.

In the first embodiment, the non-contact parts 308 are formed at four boundary parts 307 of the inner stator core 30 between the protruded parts 304 and four circular arc-shaped corner parts 302 which are the press-fitting faces to the motor case 40. Therefore, even when a burr is formed in the protrusion receiving part 408 in the case that the protrusion receiving part 408 is formed in the sidewall part 405 of the motor case 40, the outer peripheral edge portion of the inner stator core 30 does not contact with the burr.

Next, an assembling method for the stator 3 will be described with reference to FIGS. 1 and 4. In the first embodiment, assembling of the stator 3 is performed such that at first the inner stator core 30 of the first stator assembly 3a and the inner stator core 30 of the second stator assembly 3b are fixed to each other by using an adhesive or the like in a state that their pole teeth 301 face in opposite directions to each other. After that, the terminal block 8 is press-fitted to the protruded parts 304 of the inner stator cores 30 in the first stator assembly 3a and the second stator assembly 30b to be temporarily fixed. After that, an insulation sheet not shown in the drawing is fixed to the inner stator core 30 with an adhesive, a drive coil 7 is fitted to the outer periphery of the pole teeth 301 of the inner stator core 30 and fixed with an adhesive, and a wire 71 of the drive coil 7 is wound around the terminal pin 9. After that, the protruded part 304 of the inner stator core 30 is fitted to the protrusion receiving part 408 of the motor case 40 to position the inner stator core 30 to the motor case 40 in the circumferential direction and, at the same time, the motor case 40 and the inner stator core 30 are assembled by press fitting and then the temporarily fixed terminal block 8 is formally fixed to the motor case 40 and the assembling of the stator 3 is finished. An assembling method for the motor 1 other than the assembling method for the stator 3 is the same as that for a conventional motor and thus its detailed description is omitted.

Next, a manufacturing method for the motor case will be described. The motor case 40 in the first embodiment is manufactured as follows. At first, a drawing working is applied to a plate member comprised of a steel plate, which is formed by metal plating that is performed on a magnetic member such as iron and is formed in a bottomed cylindrical shape. After that, the sidewall parts 405, 405' and the bottom face part 402 and the pole teeth 401 are formed. After that, the sidewall parts 405' shown by the broken line in FIG. 2(a) are cut out along faces parallel to the axial direction "L" of the rotor shaft 21 from the opening part 404 side to form the cutout parts 406. Alternatively, the cutout parts 406 may be formed by cutting out from the bottom face part 402 side. Further, the cutting direction for the sidewall part 405' when the cutout part 406 is formed may be set in a direction perpendicular to the axial direction "L" of the rotor shaft 21, i.e., in the radial direction. The manufacturing method for the motor case is the same as that for a conventional motor case and thus a detailed description is omitted.

As described above, in the motor 1 in accordance with the first embodiment, the non-contact parts 306 are formed at the boundary parts 305 between the straight parts 303 and the four circular arc-shaped corner parts 302 in the outer peripheral edge portion of the inner stator core 30. Further, when the inner stator core 30 is disposed on the inner side of the motor case 40, the non-contact part 306 formed in the outer peripheral edge portion of the inner stator core 30 is located at the cutout end face 409 of the sidewall part 405 of the motor case 40. In other words, a burr which is formed at the cutout end face 409 of the sidewall part 405 of the motor case 40 is prevented from abutting with the outer peripheral edge portion of the inner stator core 30. Therefore, deformation of the motor case 40 in which the sidewall part 405 of the motor case 40 is deformed to the outer side in the radial direction is prevented and thus dimensional accuracy of the motor case 40 can be secured.

Further, even when a burr is formed at the cutout end face 409 of the sidewall part 405 of the motor case 40, a gap space is not formed between the circular arc-shaped corner part 302 of the inner stator core 30 and the sidewall part 405 of the motor case 40 due to the burr and thus the motor case 40 and the inner stator core 30 are joined in a magnetically satisfactory manner. Therefore, deterioration of characteristics of the magnetic circuit is prevented and thus deterioration of the motor characteristic, i.e., fluctuation of output torque and deterioration of rotational accuracy can be prevented.

Further, the dimension of the outer diameter of the inner stator core 30 which is formed by a diagonal line of the circular arc-shaped corner part 302a and the circular arc-shaped corner part 302c, and the dimension of the outer diameter of the inner stator core 30 which is formed by a diagonal line of the corner part 302b and the corner part 302d (dimensions shown by the broken lines "A" and "B" in FIG. 3) are respectively set to be slightly larger than that of the inner diameter of the motor case 40 which is formed by a diagonal line of the sidewall part 405a and the sidewall part 405c and the dimension of the inner diameter which is formed by a diagonal line of the sidewall part 405b and the sidewall part 405d (dimensions shown by the broken lines "C" and "D" in FIG. 2(a)). Accordingly, since the circular arc-shaped corner parts 302 of the inner stator core 30 are the press-fitting faces, the circular arc-shaped corner parts 302 and the inner peripheral faces of the sidewall parts 405 of the motor case 40 are fixed in an enhanced tightly contacting state and thus the motor case 40, i.e., the outer stator core and the inner stator core 30 are joined in a magnetically satisfactory manner. As a result, deterioration of characteristics of the magnetic circuit is prevented and a stable magnetic circuit is formed.

Direction of a burr which is formed at the cutout end face 409 becomes different based on a manufacturing method of the motor case 40, especially based on a forming method of the cutout part 406. Further, size of a burr formed at the cutout end face 409 becomes different due to material or thickness of the motor case 40 and a cutting tool or the like which is used in a shearing machine. Therefore, the shape and size of the non-contact part 306 which is formed at the boundary part 305 between the straight part 303 of the inner stator core 30 and the circular arc-shaped corner parts 302 may be only changed based on a difference such as a manufacturing method for the motor case 40 or material of the motor case 40. Accordingly, manufacture cost can be restrained and an inexpensive motor can be manufactured.

Further, a burr removing processing such as a barrel processing for removing a burr which is formed at the cutout end face 409 of the sidewall part 405 of the motor case 40 is eliminated or a time required for a burr removing processing is remarkably shortened. Therefore, deformation of the motor case 40 formed of a relatively thin plate member can be prevented and deformation in shape and inclination of the pole teeth 401 due to contacting of barrel with the pole teeth 401 can be prevented. Further, when a burr removing processing is eliminated, a separate facility or process for removing a burr is not required and thus manufacturing cost is restrained. Therefore, an inexpensive motor can be manufactured.

Second Embodiment

Figure 5A:
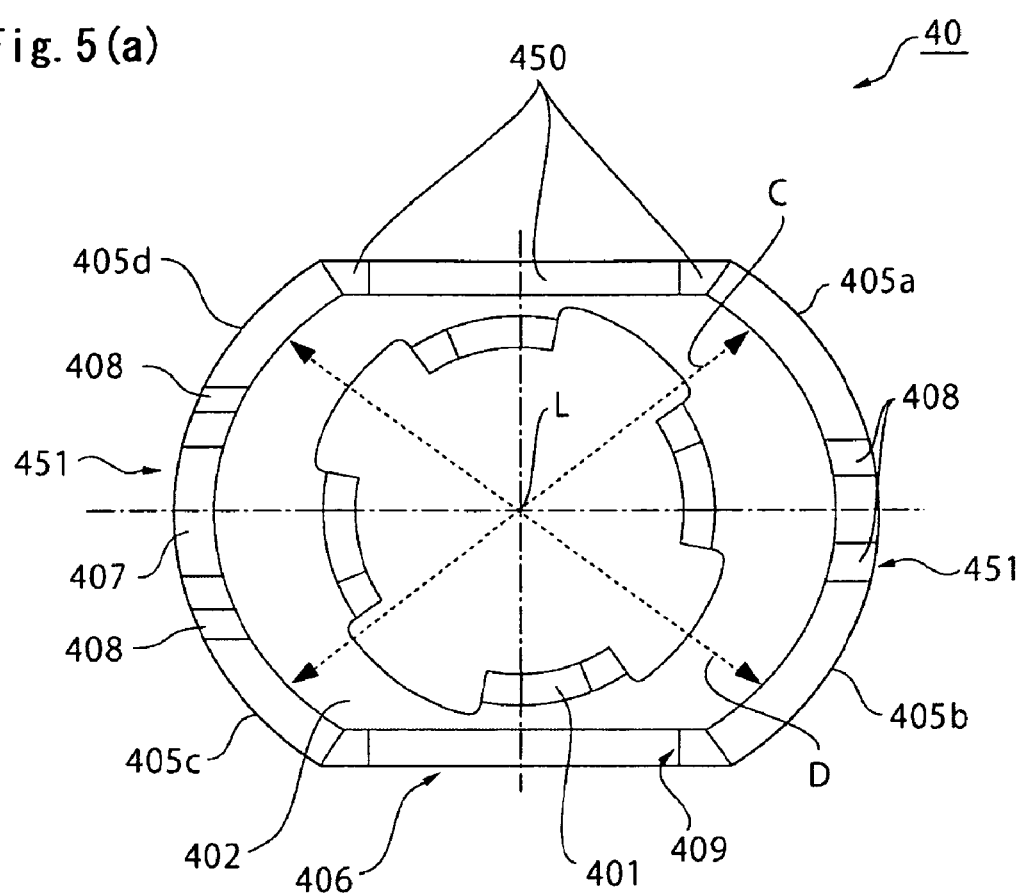
FIG. 5(a) is a plan view showing a motor case in accordance with a second embodiment of the present invention and FIG. 5(b) is its side view.
Figure 5B:
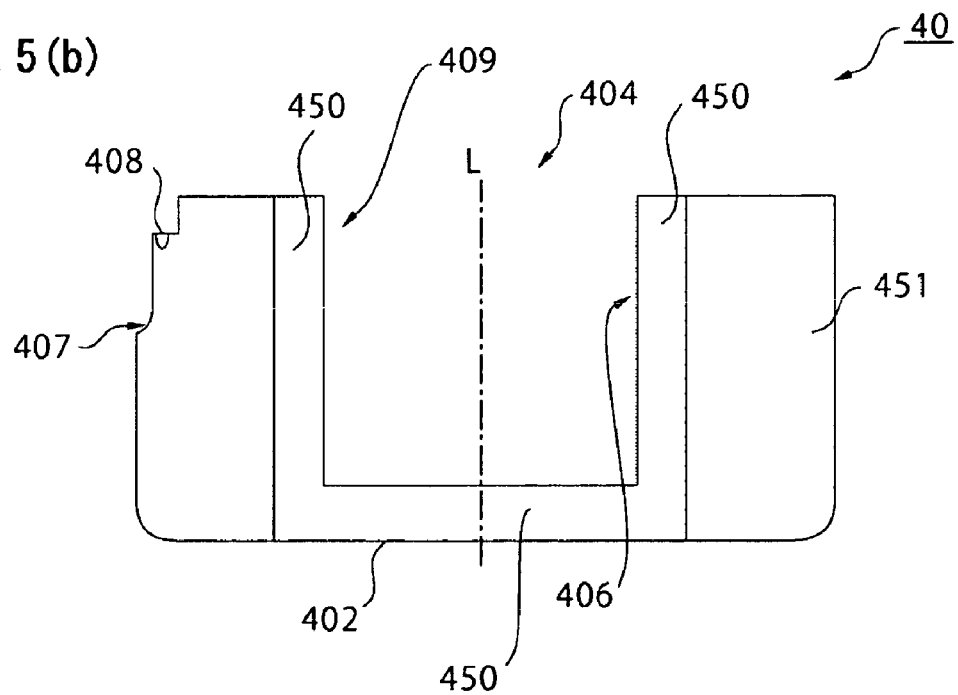

FIG. 5(a) is a plan view showing a motor case in accordance with a second embodiment of the present invention. FIG. 5(b) is its side view in which pole teeth is not shown. A basic structure of the second embodiment is similar to that of the first embodiment and thus only a structure of a motor case which is used in this second embodiment will be described below and description of a motor and an assembling method for stator cores, stator assemblies and a stator is omitted. Further, since a basic structure of the second embodiment is similar to that of the first embodiment and thus the same notational symbols are used in common portions.

As shown in FIGS. 5(a) and 5(b), the motor case 40 which is also used as an outer stator core in this second embodiment is formed such that an external shape of a bottom face part 402 viewed from the axial direction "L" of the rotor shaft 21 is a roughly oval shape. More specifically, the motor case 40 is provided with an opening part 404 which opens on one side in the axial direction "L" of the rotor shaft 21, the bottom face part 402 which faces the opening part 404 and from which a plurality of pole teeth 401 are erected from an inner circumferential edge portion toward the opening part 404 side, first sidewall parts 450 which are formed in a straight shape and extended toward the opening part 404 side from an outer periphery of the bottom face part 402 so as to face each other in the radial direction with respect to the axial direction "L" of the rotor shaft 21, and second sidewall parts 451 which are formed in a circular arc shape and extended toward the opening part 404 side from an outer periphery of the bottom face part 402 so as to face each other in the radial direction with respect to the axial direction "L" of the rotor shaft 21. Further, the motor case 40 is also provided with cutout parts 406 which are formed by cutting the straight shaped first sidewall parts 450 to leave parts of the first sidewall parts 450 uncut.

A cutout part 407 for terminal which is cut from the opening part 404 side is formed in the second sidewall part 451. Further, a plurality of protrusion receiving parts 408 are formed in the second sidewall part 451 for engaging with the protruded part 304 which is formed in the inner stator core 30. When the protruded part 304 formed in the inner stator core 30 is engaged with the protrusion receiving part 408 formed in the motor case 40, the inner stator core 30 is positioned in the circumferential direction to the motor case 40, i.e., to the outer stator core.

As shown in FIGS. 5(a) and 5(b), after the cutout part 406 has been formed, the first sidewall part 450 is slightly left so as to be continuously formed from the second sidewall part 451 and from the bottom face part 402. The first sidewall part 450 which is slightly left serves as a reinforcement portion for the motor frame 40 and thus, even when the cutout part 406 is formed, strength of the motor case 40 is maintained and the second sidewall part 451 can be prevented from being easily opened on the outer side in the radial direction.

In the second embodiment, the first sidewall part 450 is left at the portion continuously extended from the second sidewall part 451 as well as the portion continuously extended from the bottom face part 402. However, the cutout part 406 may be formed such that either one of the portions of the first sidewall part 450 is slightly left.

Figure 6A:
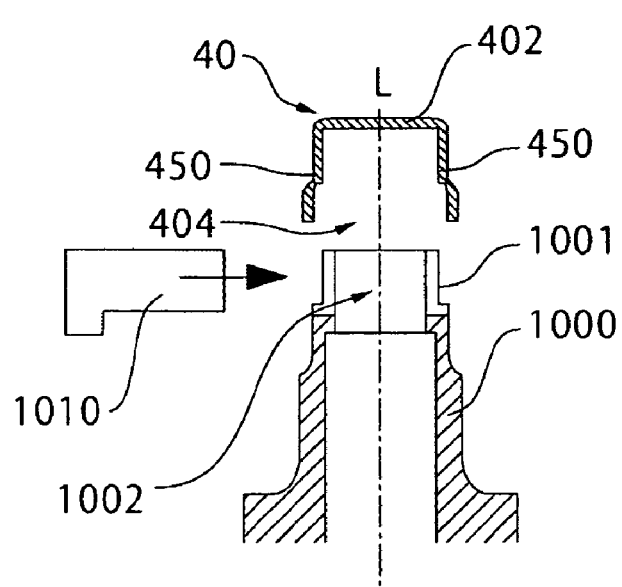
FIG. 6(a) is an explanatory cross-sectional side view showing a cutout step of the motor case in accordance with the second embodiment and FIG. 6(b) is its front view.

Next, a manufacturing method for the motor case in accordance with the second embodiment will be described below. FIG. 6(a) is an explanatory cross-sectional side view showing a cutout step of the motor case which is also used as an outer stator core, and FIG. 6(b) is its front view.

Manufacture of the motor case 40 is performed in a progressive die. In the progressive die, the following steps are performed, i.e., a blanking step for cutting off an extra portion from a plate member formed of a steel plate which is made of magnetic member such as iron on which metal plating is performed, a projecting step for forming a conical portion in order to form pole teeth 401, a forming step for forming the motor case 40 by drawing working in a roughly oval shape which includes the bottom face part 402, the first sidewall parts 450 in a straight shape which are formed from the outer periphery of the bottom face part 402 so as to face each other in the radial direction of the rotor shaft 21, and the second sidewall parts 451 in a circular arc shape which are formed from the outer periphery of the bottom face part 402 so as to face each other in the radial direction of the rotor shaft 21, a teeth forming step for forming the pole teeth 401, a cutting-out step for cutting two portions of the first sidewall parts 450 of the motor case 40 which is obtained in the above-mentioned forming step so as to leave parts of the first sidewall parts 450 uncut, a teeth bending step for perpendicularly bending the pole teeth 401, and finally a cutting-off step for separating the motor case 40 from the plate member.

Figure 6B:
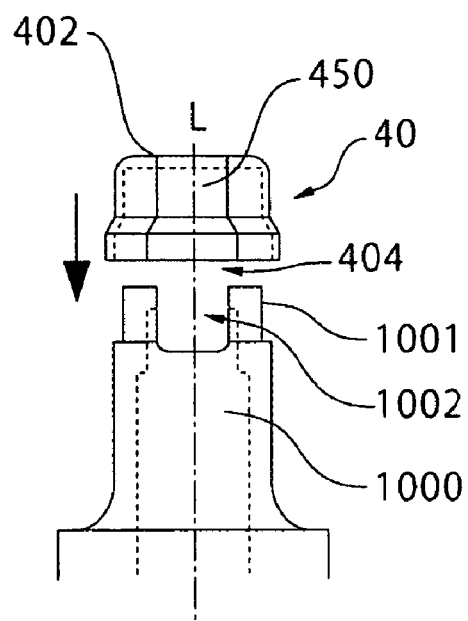
Figure 7:
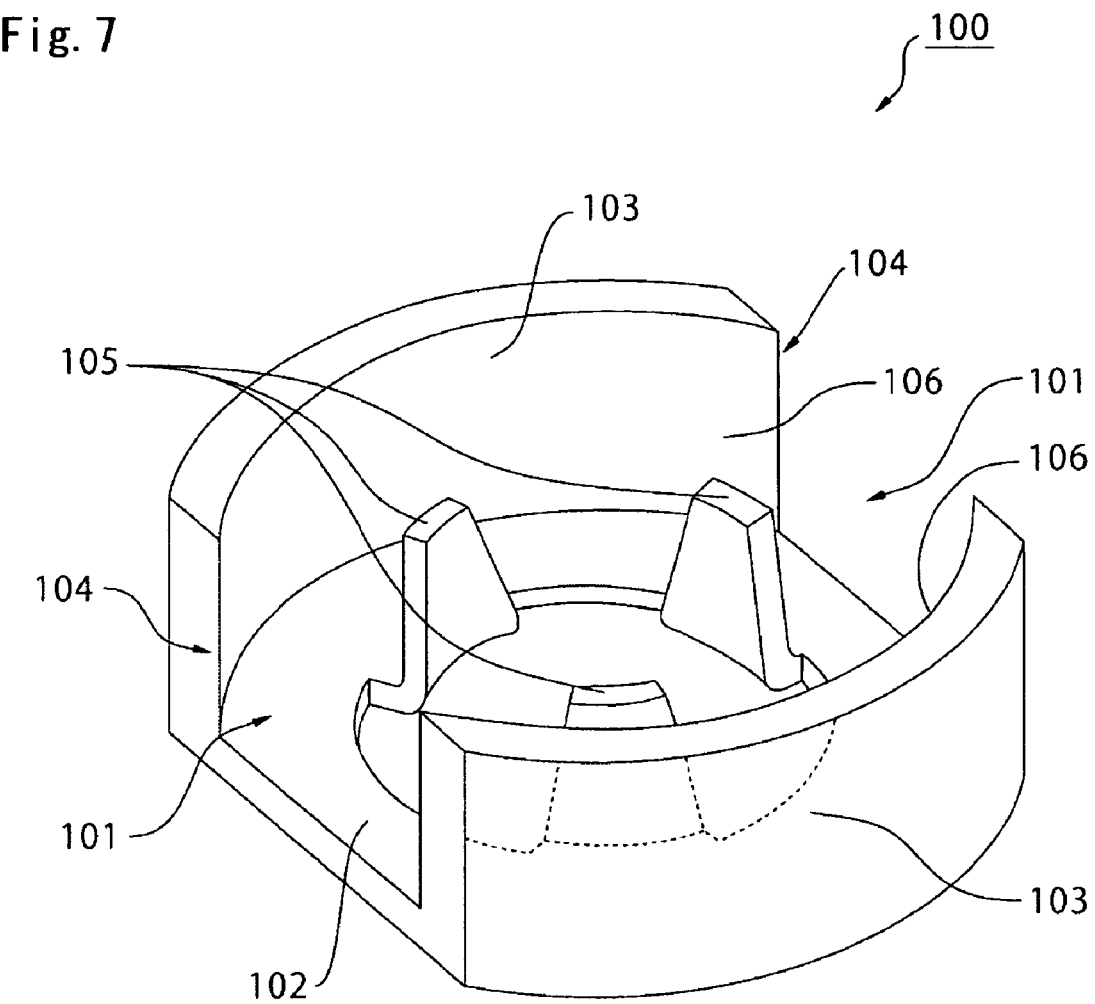
FIG. 7 is a perspective view showing a conventional motor case.

In the cutting-out step, as shown in FIGS. 6(a) and 6(b), a die 1000 and a punch 1010 are utilized. The die 1000 is provided with a cutting edge 1001 in a U-shape correspond to three sides other than the bottom face part 402 and the opening part 404 of the motor case 40. The punch 1010 punches from a side direction while the bottom face part 402 of the motor case 40 is utilized as one side of the die 1000. The shape of the punch 1010 is formed such that the punch 1010 has clearances to the die 1000 and the bottom face part 402 of the motor case 40. Further, after the die 1000 is inserted into the motor case 40, the first sidewall parts 450 are cut out one by one from the side by the punch 1010. In this case, the motor case 40 is preferably pressed to the die 1000 by using a spring or the like (the arrow direction in FIG. 6(b)). In accordance with another embodiment, in the above-mentioned cutout step, since the die 1000 is provided with a space part 1002 which is formed in a punching direction of the punch 1010, both the first sidewall parts 450 may be cut out by the punch 1010 from the side at a time after the die 1000 is inserted into the motor case 40.

As described above, the cutout part 406 is formed by cutting out the first sidewall part 450 from the side by using the punch 1010 while the bottom face part 402 of the motor case 40 is utilized as one side of the die 1000 and thus a part of the first sidewall part 450 can be left. Therefore, since the first sidewall part 450 after the cutout part 406 is formed serves as a reinforcement part for the motor case 40, strength of the motor case 40 is maintained even when the cutout parts 406 are formed and thus the second sidewall parts 451 is prevented from being easily opened on the outer side in the radial direction.

Further, when a step forming the cutout part 407 for terminal and the protrusion receiving parts 408 in the motor case 40 is incorporated in the manufacturing steps for the motor case 40, the cutout part 407 for terminal and the protrusion receiving parts 408 can be formed in a series of manufacturing steps. The method for forming the cutout part 407 for terminal and the protrusion receiving parts 408 is similarly performed as the above-mentioned cutout step and thus its detailed description is omitted.

In the motor case 40 structured as described above which is also used as an outer stator core, in addition to the effects obtained in the first embodiment, the cutout part 406 is formed in the motor case 40 such that a part of the first sidewall part 450 is left in an uncut state and thus the strength of the motor case 40 is maintained and deformation of the motor case 40 is prevented.

Further, in the cutout step, the cutout part 406 is formed by using the punch 1010 which cuts off the first sidewall part 450 from the side. Therefore, a part of the first sidewall part 450 can be left uncut to form a reinforcement part of the motor case 40.

Other Embodiments

In the embodiment described above, the motor case 40 has a structure as the outer stator core. However, the outer stator core may be structured by using a separate member from the motor case 40.

The present invention may be applied to a motor case 40 which is provided with the cutout part 406 but is not provided with the pole teeth 401.

Further, in the embodiment described above, the present invention is applied to a stepping motor. However, the present invention is not limited to a stepping motor and may be applied to another motor such as a motor with brushes and a brushless motor.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor comprising:
    a rotor shaft;
    a motor case having an opening part which opens in an axial direction of the rotor shaft, the motor case comprising;
        a bottom face part which faces the opening part;
        sidewall parts which are extended on the opening part side from an outer periphery of the bottom face part; and
        cutout parts which are formed by cutting the sidewall parts facing in parallel with each other in a radial direction of the rotor shaft;
    a stator core which is disposed in an inside of the motor case; and
    non-contact parts which are formed in an outer peripheral edge of the stator core so that the stator core does not contact with an inner face of the motor case at the non-contact parts.

2. The motor according to claim 1, wherein the stator core is disposed on the inner face of the motor case so that the non-contact part of the stator core is located at a position corresponding to a cutout end face of the sidewall part of the motor case.

3. The motor according to claim 1, wherein
    the stator core is fixed to the motor case in a tightly contacted manner with the stator core which is press-fitted to the inner face of the motor case, and
    the non-contact part of the stator core is located at a position corresponding to an end face of the cutout part which is formed in the sidewall part of the motor case.

4. The motor according to claim 3, further comprising a protrusion receiving part which is formed in the sidewall part of the motor case and which engages with a protruded part which is formed in the stator core,
    wherein the motor case and the stator core are positioned with each other in a circumferential direction by the protruded part of the stator core which is engaged with the protrusion receiving part of the motor case.

5. The motor according to claim 4, further comprising second non-contact parts which are formed on both sides of the protruded part of the stator core such that the stator core does not contact with an edge part of the sidewall part of the motor case at the second non-contact parts.

6. A motor comprising:
    a rotor shaft;
    a motor case having an opening part which opens in an axial direction of the rotor shaft, the motor case comprising;
        a bottom face part which faces the opening part;
        first sidewall parts which are formed in a straight shape and extended on the opening part side from an outer periphery of the bottom face part;
        second sidewall parts which are formed in a circular arc shape and extended on the opening part side from the outer periphery of the bottom face part; and
        cutout parts which are formed by cutting the first sidewall parts to leave a part of the first sidewall part uncut;
    a stator core which is disposed on an inner face of the motor case; and non-contact parts which are formed in an outer peripheral edge of the stator core so that the stator core does not contact with the inner face of the motor case at the non-contact parts.

7. The motor according to claim 6, wherein the stator core is disposed on the inner face of the motor case such that the non-contact part of the stator core is located at a position corresponding to a cutout end face of the first sidewall part of the motor case.

8. The motor according to claim 6, wherein the stator core is fixed to the motor case in a tightly contacted manner with the stator core which is press-fitted to the inner face of the motor case, and the non-contact part of the stator core is located at a position corresponding to an end face of the cutout part which is formed in the first sidewall part of the motor case.

9. The motor according to claim 8, further comprising a protrusion receiving part which is formed in the second sidewall part of the motor case and which engages with a protruded part which is formed in the stator core, wherein the motor case and the stator core are positioned with each other in a circumferential direction by the protruded part of the stator core which is engaged with the protrusion receiving part of the motor case.

10. The motor according to claim 9, further comprising second non-contact parts which are formed on both sides of the protruded part of the stator core such that the stator core does not contact with an edge part of the second sidewall part of the motor case at the second non-contact parts.

11. A manufacturing method for a motor case of a motor which includes a rotor shaft, a motor case having an opening part which opens in an axial direction of the rotor shaft, the motor case including a bottom face part which faces the opening part, first sidewall parts which are formed in a straight shape and extended on the opening part side from an outer periphery of the bottom face part, second sidewall parts which are formed in a circular arc shape and extended on the opening part side from the outer periphery of the bottom face part, and cutout parts which are formed by cutting the first side wall parts to leave a part of the first sidewall part uncut, a stator core which is disposed on an inner face of the motor case, and non-contact parts which are formed in an outer peripheral edge of the stator core so that the stator core does not contact with an inner side of the motor case at the non-contact parts, comprising:

a forming step for forming the motor case in a shape having the first sidewall part, the second sidewall part and the bottom face part by drawing working; and a cut-out step for forming the cutout part in the first sidewall part which is formed by the forming step, the cut-out step being performed from a side direction such that a part of the first sidewall part is left uncut.

12. A motor comprising:

a rotor shaft;

an outer stator core having an opening part which opens in an axial direction of the rotor shaft, the outer stator core comprising;

a bottom face part which faces the opening part;

sidewall parts which are extended on the opening part side from an outer periphery of the bottom face part; and cutout parts which are formed by cutting the sidewall parts facing in parallel with each other in a radial direction of the rotor shaft; and an inner stator core which is disposed in an inside of the outer stator core;

wherein the inner stator core is fixed to the outer stator core in a tightly contacted manner with the inner stator core which is press-fitted to an inner face of the outer stator core, and non-contact parts are formed in an outer peripheral edge of the inner stator core so that the inner stator core does not contact with the inner face of the outer stator core at a position corresponding to an end face of the cutout part which is formed in the sidewall part of the outer stator core.

13. The motor according to claim 12, further comprising a protrusion receiving part which is formed in the sidewall part of the outer stator core and which engages with a protruded part which is formed in the inner stator core, wherein the outer stator core and the inner stator core are positioned with each other in a circumferential direction by the protruded part of the inner stator core which is engaged with the protrusion receiving part of the outer stator core.

14. The motor according to claim 13, further comprising second non-contact parts which are formed on both sides of the protruded part of the inner stator core such that the inner stator core does not contact with an edge part of the sidewall part of the outer stator core at the second non-contact parts.

15. The motor according to claim 12, wherein the sidewall part of the outer stator core includes first sidewall parts which are formed in a straight shape and extended on the opening part side from an outer periphery of the bottom face part, and second sidewall parts which are formed in a circular arc shape and extended on the opening part side from the outer periphery of the bottom face part, and the cutout part is formed by cutting the first side wall part to leave a part of the first sidewall part uncut, and non-contact parts are formed in an outer peripheral edge of the inner stator core so that the inner stator core does not contact with the inner face of the outer stator core at a position corresponding to an end face of the cutout part which is formed in the first sidewall part of the outer stator core.

16. The motor according to claim 15, further comprising a protrusion receiving part which is formed in the second sidewall part of the outer stator core and which engages with a protruded part which is formed in the inner stator core, wherein the outer stator core and the inner stator core are positioned with each other in a circumferential direction by the protruded part of the inner stator core is engaged with the protrusion receiving part of the outer stator core.

17. The motor according to claim 16, further comprising second non-contact parts which are formed on both sides of the protruded part of the inner stator core such that the inner stator core does not contact with an edge part of the second sidewall part of the outer stator core at the second non-contact parts.

* * * * *